United States Patent
Norman et al.

(10) Patent No.: US 6,621,963 B1
(45) Date of Patent: Sep. 16, 2003

(54) SUBMARINE CASING FOR A SUBMARINE OPTICAL CABLE

(75) Inventors: Philip Andrew Norman, Hertfordshire (GB); Peter Worthington, Hampshire (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/583,286

(22) Filed: May 31, 2000

(30) Foreign Application Priority Data

Jun. 1, 1999 (GB) ............................................. 9912746

(51) Int. Cl.$^7$ ................................................. G02B 6/44
(52) U.S. Cl. ........................................ 385/100; 385/105
(58) Field of Search .................... 385/100, 102–105, 385/134

(56) References Cited

U.S. PATENT DOCUMENTS

| | | | | |
|---|---|---|---|---|
| 4,516,830 A | * | 5/1985 | Guazzo | 385/99 |
| 4,606,603 A | * | 8/1986 | Cairns | 385/58 |
| 4,696,543 A | * | 9/1987 | Pitt et al. | 385/102 |
| 4,708,427 A | * | 11/1987 | Ejiri et al. | 385/134 |
| 4,717,236 A | * | 1/1988 | Dewing | 385/109 |
| 4,718,747 A | * | 1/1988 | Bianchi et al. | 385/103 |
| 4,773,729 A | * | 9/1988 | Mignien | 385/135 |
| 5,218,658 A | * | 6/1993 | Macleod | 385/107 |
| 5,455,881 A | * | 10/1995 | Bosisio et al. | 385/100 |
| 5,602,952 A | * | 2/1997 | Rashleigh et al. | 385/100 |
| 5,661,842 A | * | 8/1997 | Faust | 174/93 |
| 5,896,482 A | * | 4/1999 | Blee et al. | 385/107 |
| 6,028,974 A | * | 2/2000 | Shyu et al. | 385/100 |

FOREIGN PATENT DOCUMENTS

| | | |
|---|---|---|
| JP | 53-111495 | 9/1978 |
| JP | A 53 111495 | 9/1978 |

* cited by examiner

Primary Examiner—Lynn Field
Assistant Examiner—Hae Moon Hyeon
(74) Attorney, Agent, or Firm—Sughrue Mion, PLLC

(57) ABSTRACT

A submarine casing for a submarine cable is shielded by a metal sheath from the deleterious effects of hydrogen generated from a sea-earth by electrolysis. Cylindrical parts (3,4) are covered by a wrapped metal sheet (8) and tapering parts by a fitted or shrunk sleeve (9) overlapping the sheets and having a metal lining (10), making up the sheath.

12 Claims, 3 Drawing Sheets

SUBMARINE CASING FOR A SUBMARINE OPTICAL CABLE

FIELD OF THE INVENTION

The present invention relates to a submarine casing for a submarine optical cable in a submarine communications system.

BACKGROUND OF THE INVENTION

A submarine optical-fibre communications system comprises high-capacity long-haul transmission links between land masses. The main trunk of these links connects two remote land masses, each land mass having an end station where the submarine cable is terminated. The main trunk may also include a branching unit for connecting the main trunk to another land mass via a spur to provide an additional transmission link. An example of a branching unit is shown in FIGS. 1 and 2, As shown, the branching unit 1 has three flexible coupling zones 2, each housing an extremity box 3 which provides a terminus for a submarine cable 4 connecting the submarine cable 4 to optical and/or electrical devices inside the branching unit 1. FIG. 2 shows the prior art protective features for the extremity box 3 and submarine cable 4. The cable may carry electrical as well as optical signals; it may include an electrical power lead. The extremity box 3 and the submarine cable 4 are covered in a polyethylene casing 5 to provide high voltage insulation. The submarine cable 4 and casing 5 have strength member 6 (stranded longitudinal wires or threads) and are enclosed in armour, to prevent physical damage. The armour 11 is helical winding(s) of metal wire or strip. Its outer surface may be covered in tar 7.

In normal use, devices in the branching unit are powered through a power lead in at least one cable 4, from its associated end station to a sea-earth (not shown) at the branching unit 1. The sea-earth typically comprises a length or a block of metal exposed to the sea and coupled to electrical relays in the branching unit 1. Current flows through the sea-earth causing electrolysis of the surrounding sea water leading to the generation of large quantities of hydrogen gas, typically in excess of 15 liters per day. The partial pressure of hydrogen around the branching unit 1 is normally minimised due to tidal flow. However, it is not uncommon for the branching unit 1 to become buried making it harder for hydrogen to escape and consequently hydrogen builds up around the branching unit 1. In this environment, hydrogen is able to diffuse into the submarine casing either directly into the extremity box 3 or along the polymer casing 5 of the submarine cable 4 and then into the extremity box 3.

Ingress of hydrogen directly into the extremity box 3 occurs through joints and fixings in the extremity box 3. Although the extremity box 3 is covered with a layer of polyethylene to provide high voltage insulation, this provides no effective barrier to the ingress of gas since polyethylene is permeable to hydrogen. In an optical fibre cable 4, glass fibre(s) run though a protective copper casing enclosed in the polyethylene casing 5 and which acts as the power lead to the branching unit 1. The hydrogen can diffuse through the polyethylene casing 5 but not through the copper casing. However, when the hydrogen diffuses through the polyethylene casing 5 it passes along the outside of the copper casing until it reaches the cable terminus at the extremity box 3, and once inside the extremity box 3, hydrogen can pass inside the copper casing where it diffuses into the interstices of the glass fibres leading to optical loss. Repairing the optical fibres in a submarine cable 4 underwater is a major undertaking and results in a loss of traffic. Clearly this situation is highly undesirable and needs to be avoided.

One possible solution is to locate the sea-earth at a sufficient distance from the submarine casing so that hydrogen cannot diffuse into the casing, usually at least 5 meters or so from the branching unit 1. This form of sea-earth is bulky and awkward to handle and makes it extremely difficult for the cable ship to lay the submarine cable 4. It is also difficult to guarantee the correct positioning of the sea-earth on the sea bed.

The branching unit 1 is not the only part of this submarine system which has an integral or associated sea-earth. Other connectors (e.g. repeaters) may be powered and have a sea-earth and present the same problem of major hydrogen generation. However, other parts of the submarine cable 4 may unintentionally form an electrical contact with sea water to create a short circuit, for example where two lengths of submarine cable 4 are joined. This will also lead to the generation of hydrogen which even though it generated in much lower quantities will still if there is corrosion or breakage diffuse into the optical fibres and cause high optical loss.

SUMMARY OF THE INVENTION

According to the present invention, a submarine casing for a submarine optical cable comprises a bonded metal sheath to reduce the ingress of hydrogen into the casing when submerged.

In JP-A-53111495 it has been proposed to adhesively wrap an aluminium tape helically around a join in an aluminium conductor of an underwater coaxial cable so as to prevent ingress of water at the joint and consequent corrosion.

In the present invention, however, the metal sheath provides an effective barrier against the ingress of hydrogen. The sheath may be a wrapping of metal. The metal is impermeable to hydrogen. The wrapping may be a spiral to increase the leak path length of the bonding layer to further reduce the ingress of hydrogen by diffusion through it.

Alternatively, the metal sheath may comprise a sleeve. Preferably, the sleeve comprises a sleeve of a heat-shrinkable material having a circumferentially concertina-able metal inner liner.

Preferably, the metal sheath comprises the combination of a number of metal sheets wrapped at least once around the casing and a number of fitted sleeves. Most preferably, the end of each fitted sleeve overlaps a portion of the metal sheet; the sheath then completely encloses the inside of the casing in metal.

Preferably, the metal is bonded using an adhesive. Preferably, the adhesive is a hot melt adhesive, an epoxy adhesive or an acrylic adhesive.

The present invention also provides a method of manufacturing a submarine casing comprising the step of bonding a metal sheath to the casing.

The present invention further provides a branching unit or cable connector comprising a submarine casing according to the present invention and with a sea-earth associated with the unit or connector.

BRIEF DESCRIPTION OF THE DRAWINGS

An example of the present invention will now be described detail with reference to the accompanying drawings, in which.

DETAILED DESCRIPTION OF THE INVENTION

Figure 1:
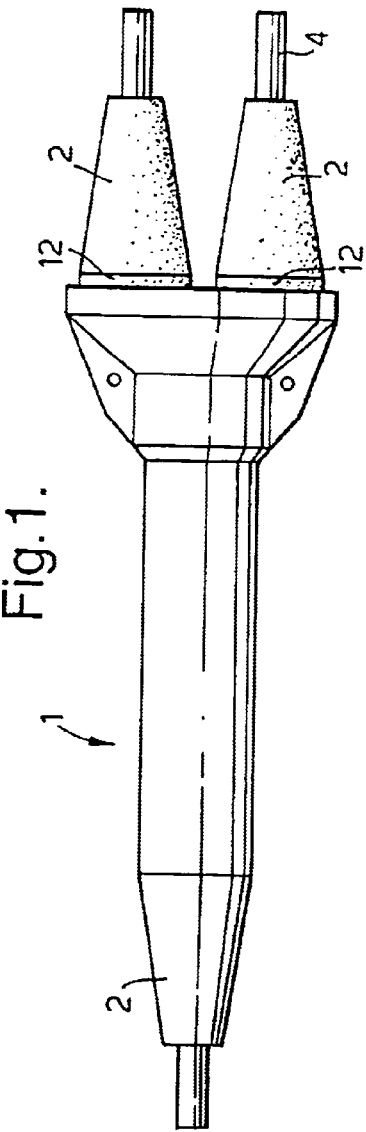
FIG. 1 is a simplified external view of a branching unit.
Figure 2:
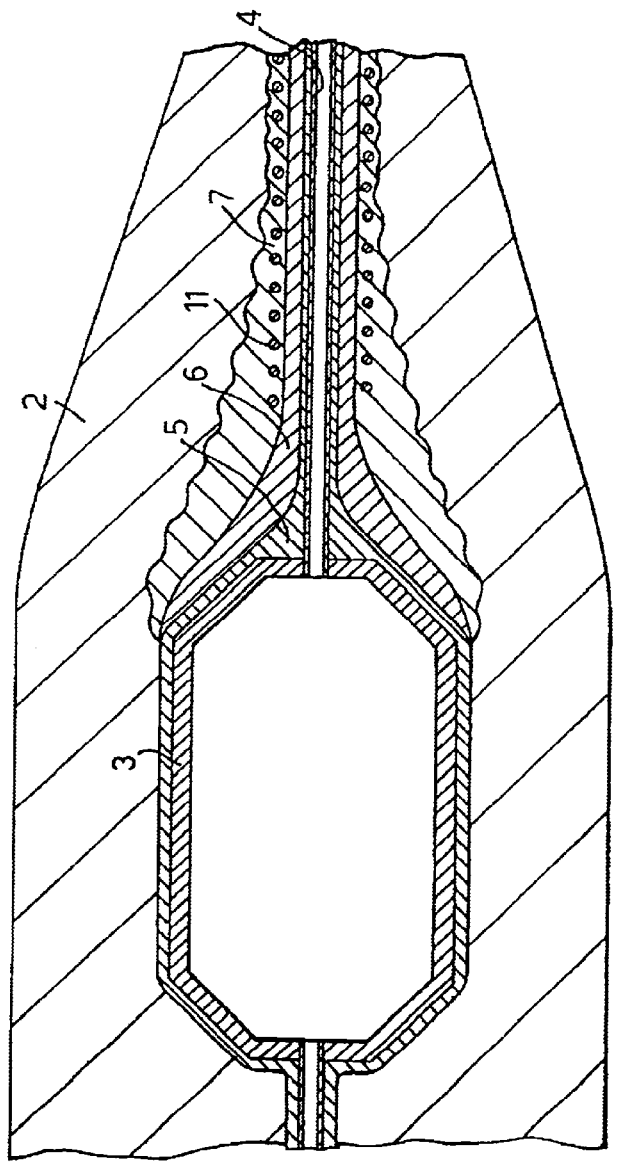
FIG. 2 is a simplified sectional view of a prior art extremity box located inside one of the flexible coupling zones of the branching unit.
Figure 3:
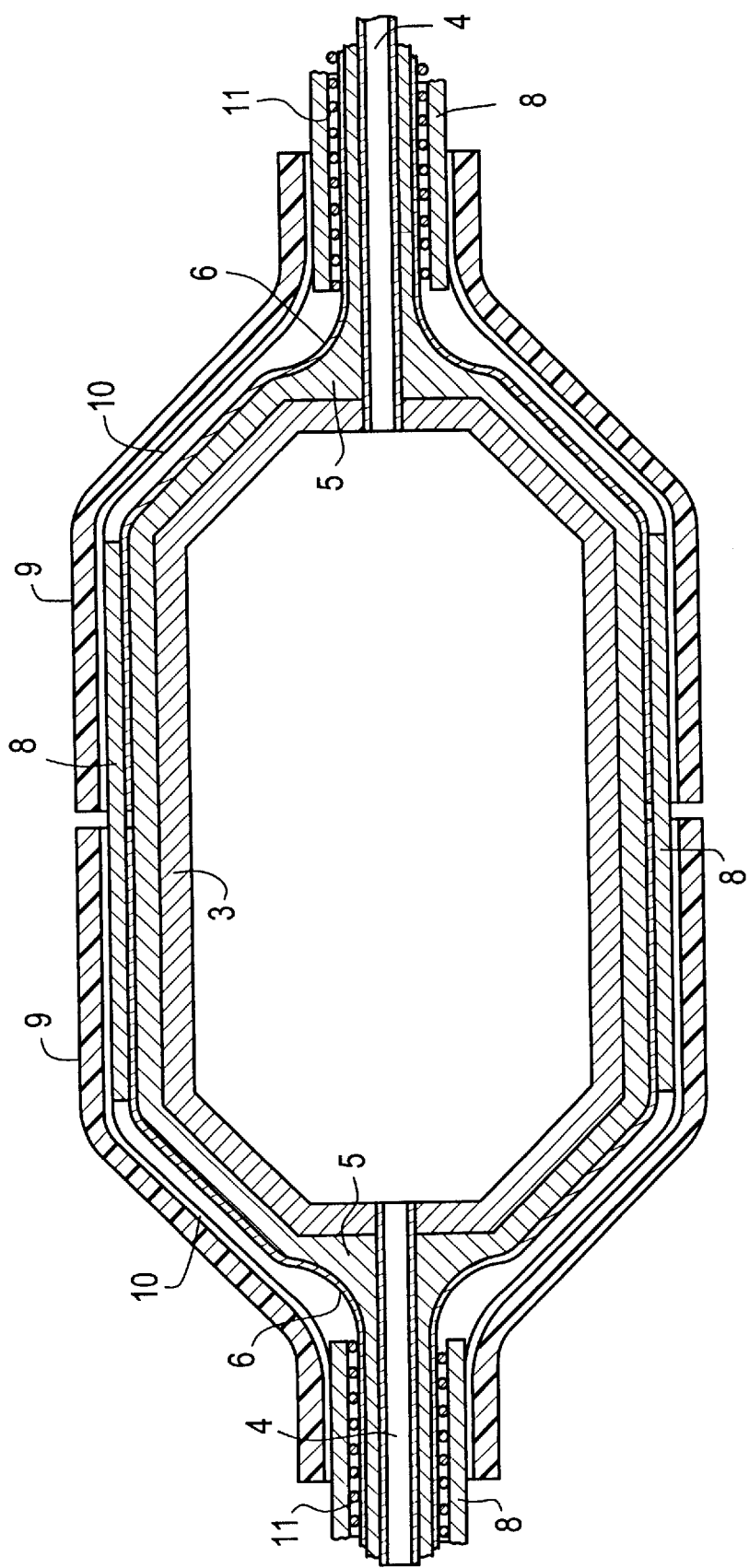
FIG. 3 is a simplified sectional view of an extremity box embodying the invention by having a metal sheath bonded thereto.

In FIG. 3 like parts are given the same reference numbers as in FIG. 2, already described. However, FIG. 3 shows a preferred embodiment of the present invention in which a metal sheet 8 is bonded to the submarine cable 4 and to the cylindrical section of an extremity box 3 of a branching unit and two fitted sleeves 9 are applied to the two ends of the extremity box 3 covering the longitudinal edge portions of the metal sheets 8, thereby providing a metal sheath which completely covers the box and protects against the ingress of hydrogen.

As shown, the cylindrical sections of the extremity box 3 and the submarine cable 4 are spirally wrapped with at least one layer of metal sheet 8 to form a sheath around them. Two fitted sleeves 9 overlap with the otherwise exposed edge portions of the metal sheets 8. The metal wrappings are themselves bonded to a polyethylene casing 5 of the extremity box 3 and of the submarine cable 4 using an adhesive. Two routes for the ingress of hydrogen could be envisaged, either directly through the wrapping or by diffusing through the material used to bond the wrapping to the casing. The metal itself is impermeable to hydrogen and thus prevents ingress of hydrogen via a first potential route; the path length defined by the adhesive and the presence of the adhesive itself greatly reducing the ingress of hydrogen via the second potential route.

The metal sheet 8 can be made from a flexible sheet of single metal, for example aluminium, or a composite, for example a tin-copper-tin composite. The sheet will usually be in the form of a tape of the same width as the axial length of the box 3. The adhesive used is selected to prevent degradation of the polyethylene casing 5. A self-adhesive metal sheet 8 is typically used for convenience, for example "EDI" shielding tapes manufactured by 3M with an acrylic adhesive backing. A non-self adhesive, such as a hot-melt adhesive or an epoxy adhesive, can also be used, in which case the adhesive can be applied as an adhesive sheet or carried in a solvent. Where an adhesive sheet is employed, the adhesive sheet is applied onto the metal sheet 8 or onto the polyethylene casing 5 and the metal sheet 8 is then wrapped around the polyethylene casing 5 and heated to create a bond. Heating should not exceed 120° C. in order to prevent degradation of the polyethylene casing 5. Where the adhesive is carried in a solvent, it is applied to the metal sheet 8 or the polyethylene casing 5 and the solvent is allowed to evaporate off. The solvent is preferably a non-chlorinated solvent in order to prevent degradation of the polyethylene casing 5.

The ingress of hydrogen along the adhesive path is reduced by the adhesive and this can be improved further by increasing the path length along which the hydrogen has to travel by increasing the number of turns of the sheet metal wrapping 8 in a spiral.

Figure 4:
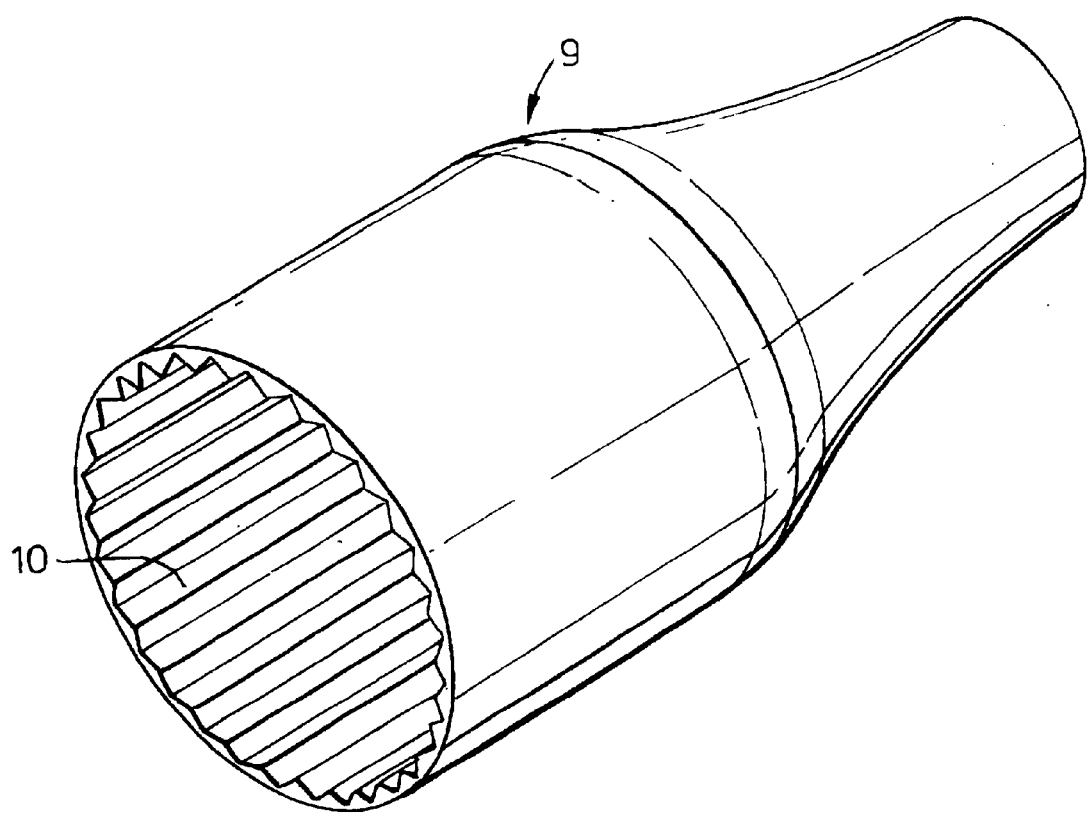
FIG. 4 is a simplified perspective view of a heat-shrinkable sleeve which is a preferred embodiment of a fitted sleeve used in the metal sheath shown in FIG. 3.

The non-cylindrical sections of the extremity box 3 would be difficult to wrap smoothly with the metal wrapping 8. In order to cover the non-cylindrical sections of the extremity box 3, a pair of fitted sleeves 9 are used. Each fitted sleeve 9 has an inner metal liner 10 and is preshaped to fit over the ends of the extremity box 3. The fitted sleeve 9 is either made from a sufficiently stretchable material so that it may be drawn over and fit tightly around the ends of the extremity box, a so-called "glove fit", or it is made from a heat-shrinkable material. Preferably, a heat-shrinkable sleeve is used in which the outer layer of the sleeve is made from radiation cross-linked polyethylene manufactured by Raychem. An example of this is shown in FIG. 4. Inside the sleeve 9 is a circumferentially fluted concertina-able metal inner liner 10 which provides a first barrier against the ingress of hydrogen. This design allows the metal liner to be compressed onto the ends of the sheets 8 without splitting when an only slightly over-size (say 1–2 mm excess diameter) heat-shrinkable sleeve shrinks in response to applied heat. Examples of suitable metals include aluminium and plated nickel-copper tin. The fitted sleeve 9 prevents ingress of hydrogen directly into the extremity box 3 or submarine cable 4 and because of its substantial (preferably over 100 mm) overlap over the wrapping 8 provides a long path length for ingress of hydrogen to the box via the otherwise exposed end portions of the metal wrapping 8. The concertina-ed metal liner does not lie flat on the cylindrical surface of the wrapping, but the gravules between the flutings are filled with adhesive acting over the substantial leak path, to block hydrogen ingress.

The fitted sleeve 9 is bonded to the polyethylene casing 5 of the extremity box 3 and of submarine cable 4 by an adhesive, preferably a hot-melt adhesive or an epoxy adhesive as described above.

When a hot-melt adhesive is used, the shrinking of a heat-shrinkable sleeve 9, the bonding of its adhesive and the bonding of that of the metal sheet 8 can all be achieved in a single heat-treatment as for example with a blowtorch (completion being indicated by the start of extrusion of adhesive past the ends of sleeve 9) or, preferably because more controlledly, in an oven.

With the extremity box 3 protected from the ingress of hydrogen, it is possible to locate the sea-earth on or near to a branching unit 1. This arrangement provides much easier handling during cable laying. The sea-earth may be integral with the branching unit 1 itself, for example being a metal ring around the body of the branching unit 1, or being exposed metal armour 11.

What is claimed is:

1. A submarine casing for a submarine optical cable, comprising a bonded sheath containing at least one metal sheet, impermeable to hydrogen, to reduce ingress of hydrogen into the casing, wherein the metal sheet is wrapped at least once around a cylindrical portion of the casing, and wherein the sheath comprises a sleeve with a metal layer disposed around a tapering end portion of the casing.

2. A submarine casing according to claim 1, in which the sleeve is of a heat-shrinkable material having a circumferentially concertina-able metal inner liner as the metal layer.

3. A submarine casing according to claim 1, in which the sheath comprises the combination of said at least one metal sheet wrapped at least once around the cylindrical portion of the casing and a sleeve with a metal layer, said sleeve overlapping a longitudinal end of the wrapped sheet.

4. A submarine casing according to claim 3, in which the sheath is bonded onto an outer surface of the casing by an adhesive.

5. A submarine casing according to claim 3, wherein the submarine casing is disposed in a submarine branching unit for a submarine optical cable.

6. A submarine casing according to claim 3, wherein the submarine casing is disposed in a submarine cable connector for a submarine optical cable.

7. A submarine casing according to claim 1, wherein the submarine casing is disposed in a submarine cable connector for a submarine optical cable.

8. A submarine casing according to claim 1, wherein said sleeve is disposed at each end of the casing, and wherein each sleeve overlaps the cylindrical portion by substantially half of the width of the at least one metal sheet.

9. A submarine casing according to claim 1, wherein the submarine casing is disposed in a submarine branching unit for a submarine optical cable.

10. A submarine casing for a submarine optical cable, comprising a bonded sheath containing at least one metal sheet, impermeable to hydrogen, to reduce ingress of hydrogen into the casing, wherein the submarine casing is disposed in a submarine branching unit for a submarine optical cable.

11. A submarine casing according to claim 10, further comprising a sea-earth integral with the branching unit.

12. A method of manufacturing a submarine casing for an optical cable comprising:

wrapping a first metal sheet around a cylindrical outer surface of the casing;

placing respective sleeves around each tapering end portion of the casing, each sleeve comprising a second metal sheet; and bonding the first metal sheet to the cylindrical portion of casing and bonding the sleeves to the first metal sheet to form a metal sheath around the casing.

\* \* \* \* \*